United States Patent

[11] 3,548,063

| [72] | Inventor | Harry E. Bryan<br>2817 Fondren, Dallas, Tex. 75205 |
|---|---|---|
| [21] | Appl. No. | 724,705 |
| [22] | Filed | Apr. 29, 1968 |
| [45] | Patented | Dec. 15, 1970 |

[54] NAVIGATION TRAINING DEVICE
11 Claims, 5 Drawing Figs.

[52] U.S. Cl.................................................. 35/10.2,
35/12
[51] Int. Cl............................................. G09b 9/08
[50] Field of Search........................................ 35/10.2,
10.4, 12; 343/108, 107

[56] References Cited
UNITED STATES PATENTS

| 2,809,444 | 10/1957 | Woods et al................. | 35/10.2 |
| 2,817,160 | 12/1957 | Woods et al................. | 35/10.2 |
| 3,151,310 | 9/1964 | Shepherd et al............... | 35/10.2X |
| 3,215,823 | 11/1965 | Ariessohn et al.............. | 35/10.2X |
| 3,234,552 | 2/1966 | Bostwick..................... | 343/107 |
| 3,307,191 | 2/1967 | Crane........................ | 343/108 |

*Primary Examiner*—Malcolm A. Morrison
*Assistant Examiner*—Felix D. Gruber
*Attorneys*—Jack A. Kanz and Kenneth R. Glaser ABSTRACT: Disclosed is a navigation training device for use in teaching the principles and proper use of omnirange radio navigation. The device includes a rotatable disc simulating an omnirange with a VOR station located at its center. The disc is divided into six distinct sectors, each connected with appropriate electrical circuitry which is independently connected with a voltage source by a model aircraft carrying a display meter. The display meter duplicates information which would be displayed in the cockpit of a real aircraft in the same position relative to a real VOR station. Also disclosed is a teaching method including the use of printed instruction cards for instructing the student in the proper operation of the training device.

PATENTED DEC 15 1970

INVENTOR
HARRY E. BRYAN

ATTORNEY

INVENTOR
HARRY E. BRYAN

ATTORNEY

PATENTED DEC 15 1970

INVENTOR

HARRY E. BRYAN

Jack A. Kanz

ATTORNEY

NAVIGATION TRAINING DEVICE

This invention relates to visual teaching apparatus and methods of teaching radio navigation. More particularly, it relates to an apparatus and method for use by the student pilot, navigation instructor, or any pilot for teaching and instruction in the use and understanding of radio navigation equipment, particularly omnirange radio navigation equipment.

Throughout the United States and in many other parts of the world, VHF omnidirectional radio range (commonly referred to as VOR) equipment is operated for use as navigation aids for aircraft. As the name implies, this radio equipment transmits VHF radio waves in all directions from the station. Directional information transmitted by the VOR is intercepted by airborne omnirange receiving equipment. The airborne receiving equipment converts the radio signal into visual directional information for use by the pilot.

The VOR station radiates two radio frequency signals simultaneously. One of these signals is nondirectional, has a constant phase throughout its 360 degrees of azimuth, and is known as the reference phase. The second signal is directional and rotates at a constant speed, varies in phase with the azimuth and is called the variable phase. The rotating signal is initially set so that at magnetic North the reference and variable signals are exactly in phase. In all other directions from the station the positive maximum of the variable signal occurs at some time later than the maximum of the reference signal. The fraction of a cycle that lapses between the occurence of the two maxima, at any point azimuth, identifies the azimuth angle of that point. Thus the airborne receiving equipment may measure the elapsed time between the occurrence of the two maxima and convert this information into a visual display on a cockpit instrument to inform the pilot of the bearing of his plane with reference to the VOR station.

VOR stations have been installed at various locations, each operating at an assigned frequency so as not to interfere with signals transmitted by surrounding VOR stations. A pilot, with knowledge of the frequency of the VOR station in his vicinity, may tune his VOR receiver to the assigned frequency of the VOR station and, with proper use of his airborn equipment, fly any desired course along a radial either toward or away from the VOR station. Use of the VOR receiving equipment (hereinafter referred to as the omni) while not complicated, is subject to certain problems which often plague the novice. Extensive training and long hours of practice and instruction are required to fully acquaint the student with the proper use of present day omni equipment. Most of the difficulty, however, in understanding the information displayed on the omni equipment in the cockpit stems from the student's inability to visualize the information displayed in the cockpit simultaneously with visualizing bearing and heading of his aircraft. This difficulty often results in long hours of instruction with the instructor and student working with sketches, blackboards, and written texts. Such instruction is quite time consuming for both the instructor and student and often leaves many questions of the student unanswered. Furthermore, the instructor can only verify the student's understanding of the equipment by actual tests under real conditions.

It is therefore and object of this invention to provide a visual training aid for use in instruction of the proper use of omni equipment. A further object is to provide a device which instantaneously displays information on a facsimile cockpit instrument indicating the position of a model aircraft with respect to a simulated VOR range. A further object is to provide an inexpensive training guide which may be used by the student without assistance from an instructor, and a teaching system whereby the student may at his leisure review and repeat teaching instructions until he is fully competent to understand and operate omni equipment.

Briefly, the present invention is a navigation teaching aid which has a rotatable disc with its surface divided into six mutually isolated conductive portions. Each conductive portion is connected by appropriate circuitry to display means attached to a model aircraft. When the aircraft is placed on any of the six conductive portions, the aircraft completes a circuit causing the display means to duplicate the information which would be displayed in the aircraft cockpit of a real aircraft if the real aircraft were in the position represented by the model of the training aid. The teaching aid of this invention includes means for rotation of the disc and a simulated OBS readout meter for indicating the course the student is attempting to intercept.

A particular advantage of the invention is the simultaneous visual display of both the relative position of the aircraft with respect to the VOR station, and the information which would be displayed on the cockpit instrument in an actual aircraft in the same relative position with respect to a real VOR station. A further advantage and unique feature of the invention is the incorporation of means for identifying the particular radial course being navigated to further acquaint the student with the proper terminology used in radio navigation and, through repeated use of the instruction cards, navigation problems may be presented for the student until the instructor is confident of the student's retained knowledge and understanding of the omni. Other objects, features and advantages will become more readily understood from the following detailed description taken in connection with the appended claims and attached drawings in which:

Figure 1:
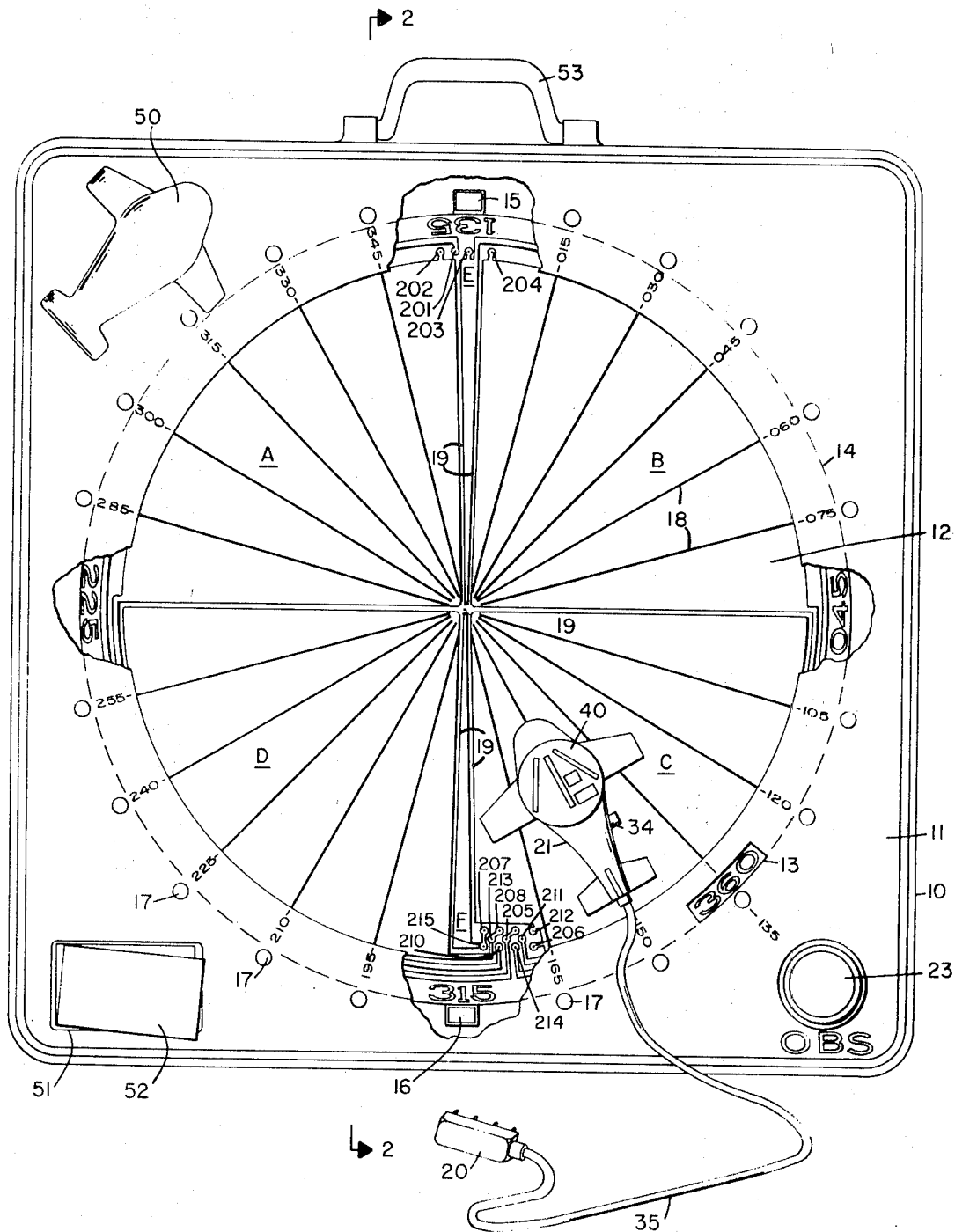
FIG. 1 is a top plan view, partially in section, of the preferred embodiment of the invention illustrating the rotatable conductive disc and model aircraft.

Most omni navigation receivers are comprised of three basic components which provide omnirange course or bearing information: (1) the course selector (also called omni bearing selector), (2) the "Left-Right" indicator (also called course deviation indicator), and (3) the "To-From" indicator.

The omni bearing selector (OBS) is usually a 360° azimuth dial with a manually rotatable pointer or a three digit mechanical counter on which any value from 0° to 359° may be exposed through a dial port. In either case, it is used to establish a magnetic bearing or course of an aircraft to or from a VOR station. The "To-From" indicator may be either a small needle that points to the words "To" or "From" appearing on the dial or may be a simple indication of either word as it appears in a small window in the dial.

The Left-Right indicator is usually a vertical needle or pointer pivoted at the top of the dial. The same needle is sometimes used to indicate left or right deviation from the ILS localizer during an approach on the instrument landing system. In omnirange flying, the Left-Right indicator tells the pilot when he left or right of the selected course to or from the VOR station. When the needle is centered, the aircraft is positioned at a point along the course either inbound (To) or outbound (From) the VOR station along the course set by the OBS. In omni navigation, the radial is named for the outbound course only.

The training aid of this invention provides a facsimile which displays the same information as that displayed on omni equipment. Furthermore, the student manipulating the training device is presented with a visual display in the form of a facsimile aircraft in relation to a simulated VOR range, and may freely reposition the craft to change bearing or heading and will immediately receive the information which would be displayed in the cockpit to a pilot making the same maneuvers with a real aircraft. Furthermore, the student pilot may select any desired course and duplicate the cockpit setting on the training unit. Upon positioning his model craft on the simulated VOR range, he may determine the reading which would be obtained in an actual VOR range and plot his course to intercept the desired radial to be flown.

It must be understood that the omni only tells the pilot his relative position or bearing from or to the VOR station, the heading of his aircraft is not indicated by the omni equipment. It must be further understood that all radials are measured and named for their outbound courses only. For example, the 180° radial lies South of the station. This radial may, for discussion purposes, be referred to as the "South" radial. An aircraft may proceed outbound (South) along the "South" radial, or it may proceed inbound (North) along the "South" radial. In both cases it must be understood that the aircraft is navigating or attempting to intercept the "South" (180°) radial. Thus a pilot may select on the OBS either of two courses along any radial. The aircraft may be proceeding "inbound" (toward the VOR station) or "outbound" (away from the VOR station) with any one selected OBS course and the omni display will be, in either case, exactly the same. Likewise, the aircraft could be spinning horizontally at any point along a radial and the omni display will not change provided the OBS setting is not changed, since the omni only indicates relative position, not heading.

Upon selecting specific OBS course, the pilot should orient his aircraft in the proper heading using a magnetic compass. When his aircraft heading, as determined by the magnetic compass, is in relatively close agreement with the OBS setting the aircraft is said to be "in phase" with the selected OBS course. An aircraft is "in phase" as long as its heading is within 89° right or left of the selected OBS setting. When the aircraft heading is more than 89° from the OBS setting, it is "out of phase."

If the aircraft heading and OBS are "in phase" and the To-From indication is From, the aircraft is proceeding outbound along (needle centered) or parallel to (needle either side of center) the desired radial from the station. In such a situation the name of the radial and the OBS setting are the same.

If the aircraft heading and OBS are "in phase" with the To-From indication indicating To, the aircraft is proceeding inbound along (needle centered) or parallel to (needle either side of center) the desired radial of the station. In this situation the name of the radial will be the reciprocal of (180° from) the selected OBS course.

In both the preceeding situations, since the aircraft headings and OBS settings are in "phase," the pilot may fly toward the needle to intercept the desired radial. However, since either situation may be, and often is, attempted with the aircraft heading and OBS out of phase (e.g. aircraft heading 180° with OBS setting of 360°), the pilot may not fly toward the needle to intercept the desired radial but must, infact, fly away from the needle in order to cause the needle to center when reaching the desired radial.

This invention is designed to clearly demonstrate this common error. Since the same error can be committed on the trainer, the student pilot can readily visualize the necessary correction that he should make. He may either rotate the OBS into phase with his aircraft heading; or he may turn his aircraft heading (by repositioning the model aircraft) into phase with his selected OBS course.

Practice on the trainer in conjunction with rise of the instruction cards will insure this objective.

Referring now to FIG. 1, there is illustrated a rotatable disc 12 with its top surface divided into six distinct conductive and mutually isolated surface portions labeled A, B, C, D, E, and F. The rotating disc 12 simulates the radiation field of a VOR station located at the center of the disc. Sectors A, B, C, and D each cover substantially all of one quadrant of the simulated field. Sectors E and F are disposed 180° apart along a line extending from the center of the disc and cover only a relatively small portion of the simulated field. Sectors E and F represent the divergent radio beam along any radial course.

The disc is mounted within a housing 10 having a top surface 11 with a centrally located aperture therein. The disc is positioned in registry with the aperture in top surface 11 so that the central portion of the disc is at all times exposed through the aperture. The disc also extends slightly under surface 11 as indicated by dashed line 14.

Figure 2:
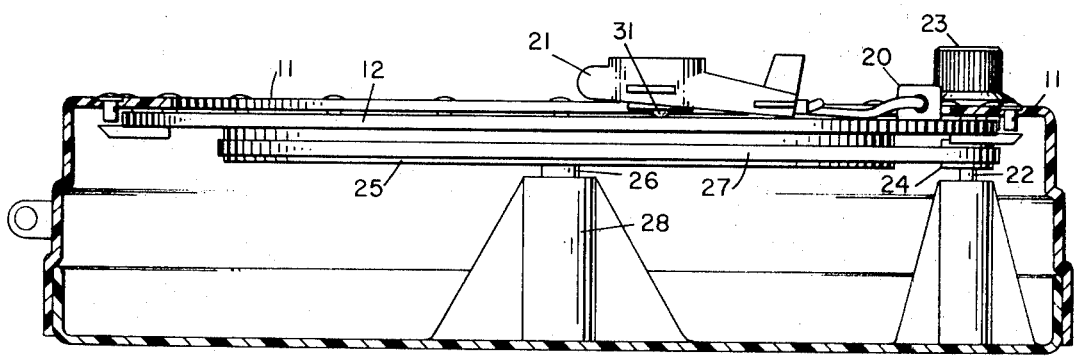
FIG. 2 is a sectional view of the device shown in FIG. 1 taken along line 2–2.

As shown in FIG. 2, the disc is mounted on a shaft 26 which is journaled in housing 28. A pulley 25 is also mounted on shaft 26. Alternatively, a flange depending from the disc may be substituted for the pulley 25. A second shaft 22 is parallel to shaft 26 and extends through the top surface 11. A knob 23 is mounted thereon. Also mounted on shaft 22 is a pulley 24. A belt 27 connects pulleys 24 and 25 to cause rotation of the disc when the operator rotates knob 23.

A dial port 13 adjacent the centrally located aperture exposes a portion of the disc surface extending under surface 11. Simulated radial lines 18 extend from the center of the disc. Suitable markers, preferrably numerals indicating the position of said radial line in degrees from a point on the disc designated 0/360°, are positioned about the outer surface and aligned with each of the radial lines 18. It will be understood that an infinite number of potential courses exist along radial lines extending from the VOR station, and a pilot may select a course along any desired radial for navigation. However, for clarity of illustration, lines 18 are positioned in suitable increments, such as 15° increments, and each line terminates at a marker on the surface of the disc near the edge.

In the illustration of FIG. 1, dial port 13 is 135° clockwise from the top of the central aperture. In order to have the conductive planes E and F always aligned along the radial marker displayed through dial port 13, the conductive planes E and F are positioned to correspond with markers 135 and 315, respectively. Thus as the disc is rotated, the marker exposed through dial port 13 will indicate the azimuth angle of conductive plane E with respect to the simulated magnetic North, which is the top of the centrally located aperture.

Thus as the disc is rotated, the OBS readings will be selectively exposed through dial port 13, and conductive portion E will always extend from the center of the disc along the radial indicated through dial port 13. Likewise, conductive portion F will extend from the center of the disc in the opposite direction, covering the radial which is 180° from the radial indicated through dial port 13.

Rotatable disc 12 may be of any suitable construction, preferably about 18 inches in diameter and of nonconductive material. The top surface of the disc is clad with a conductive material, and the conductive surface divided into the indicated sections. In the preferred embodiment a sheet of copper clad ABS plastic is cut into the desired disc size and etched by well known methods to remove all copper from the disc except the six section (labeled A—F in FIG. 1), the radial markers (which simulate the OBS numbers), and the circuit strips around the periphery of the disc. The copper is then nickel coated and thin strips of nickel removed to expose lines 18. Only the nickel is removed along lines 18, thus the entire surface of section A—D will be conductive, but lines 18 will be exposed copper. The thin lines of exposed plastic 19 are nonconductive and electrically isolate each of the conductive sectors A—F.

Each of the conductive sections is electrically attached to a conductive lead which is connected to the appropriate circuitry as explained hereinbelow. In the preferred embodiment, such leads may be formed by etched patterns as discussed above. The conductive leads terminate at a common area on the disc where interconnecting leads may be attached by soldering or by means of a plug 20.

A movable model aircraft 21 is provided which may be placed in any position on the surface of disc 12. The model aircraft supports or incorporates a facsimile omni display meter 40.

Figure 4:
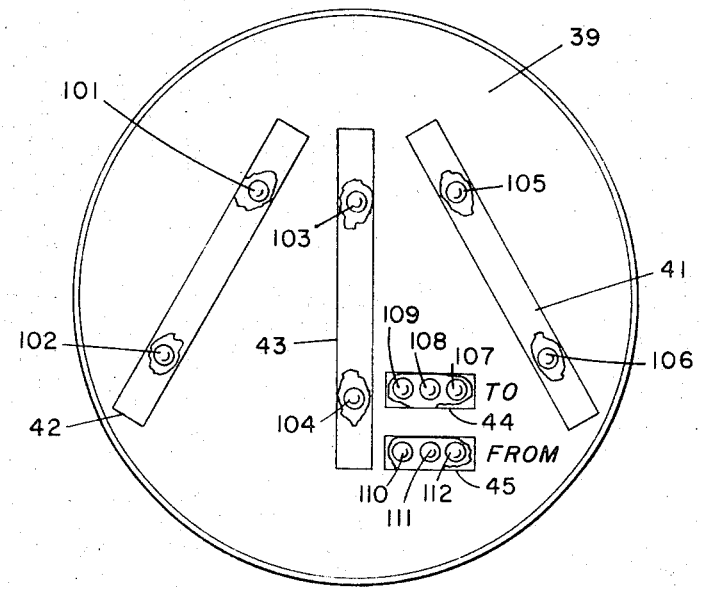
FIG. 4 is a top plan view, partially in section, of the display meter of the invention.

The informational display of the meter facsimile 40 is shown in FIG. 4. The display comprises a substantially circular meter face 39 having thin rectangular areas 41, 42, 43, 44, and 45 delineated thereon. The face plate 39 may be fabricated from relatively thin translucent materials which diffuse light passing therethrough. Positioned beneath the face plate 39 are light sources 101—112. Suitable baffles (not shown) are also positioned beneath the face 39 to conform with the outline of areas 41—45 so that when any one bulb beneath any one rectangular area is illuminated, radiation from that bulb is diffused by the surface within that particular rectangle and the entire rectangular area is substantially uniformly illuminated.

Alternatively, face plate 39 may be of opaque material with slots therein conforming to the areas 41—45. The slots may be covered with suitable translucent materials which diffuse light emanating from the light sources therebelow, thus producing substantially uniformly illuminated rectangular areas.

Rectangular areas 41, 42 and 43 simulate the primary positions of a pointer hinged from the top of the meter face. Thus, area 42 simulates a pointer positioned to the left, 43 a centered position, and 41 a pointer indication to the right. The area within rectangle 44 may have the word "To" inscribed thereon or adjacent thereto and the area within rectangle 45 have the word "From" lettered thereon or adjacent thereto so that when any of the bulb beneath area 44 is illuminated, the word "To" is indicated by illumination. Likewise when any one bulb beneath area 45 is illuminated the word "From" is indicated.

For visual reference, the teaching device should be considered as portraying the radiation field of a VOR station positioned at the center of the disc. In all cases magnetic North is at the top of the device. Thus in the position shown in FIG. 1, the radial covered by conductive portion E is the 360° radial, and the 180° radial is covered by conductive portion F. When the disc is rotated clockwise 90°, conductive portion E will cover the 90° radial, conductive portion F will cover the 270° radial, and the radial marking 090 will be exposed through dial port 13.

From the foregoing it will be apparent that the radial covered by conductive section F is always 180° from the radial indicated through port 13, thus the training device duplicates and illustrates one of the most difficult navigation ambiguities in the use and understanding of omni navigation.

Figure 5:
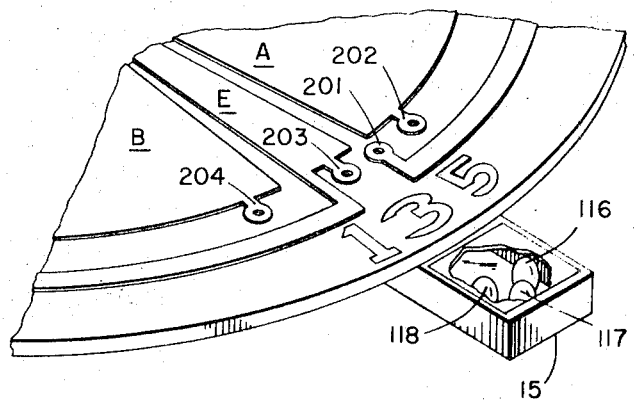
FIG. 5 is a perspective view, partially in section, of a portion of the rotatable disc.

In order to aid the student in proper use of the omni equipment and in identifying the radial course along which he is navigating, the training aid incorporates display means for properly identifying the radial which must be intercepted and followed to maintain the desired course. In the embodiment shown, light sources are attached to the disc in a fixed relation therewith and rotate with the disc. The light sources are mounted in mountings 15 and 16 which extend outwardly from disc 12 as indicated in FIG. 1. Mounting 15 is shown in more detail in FIG. 5. The mountings 15 and 16 may be of any suitable construction, preferably having an open or transparent top surface which is substantially parallel to the top surface of the disc 12. Light sources 116, 117 and 118 are contained within mounting 15 and light sources 113, 114, and 115 are contained within mounting 16.

Disposed around the central aperture in the surface 11 are a series of small windows 17. The number of windows 17 corresponds with the number of radial lines illustrated by the trainer. Therefore, in the model shown, windows 17 are disposed in 15° increments radially around the central aperture and are aligned with the circular path traveled by light mountings 15 and 16. Since the OBS markings of the periphery of the disc which appear through window 13 are 135° ahead of the light mounting 15, the OBS marker exposed through dial port 13 will indicated the radial line which is indicated by illumination of light sources in mounting 15 through the appropriate aperture in surface 11. Energization of light sources in mounting 16 will illuminate the window 180° from the OBS marker showing through window 13. Each of windows 17 are appropriately labeled in 15° increments clockwise around the central aperture in surface 11.

Figure 3:
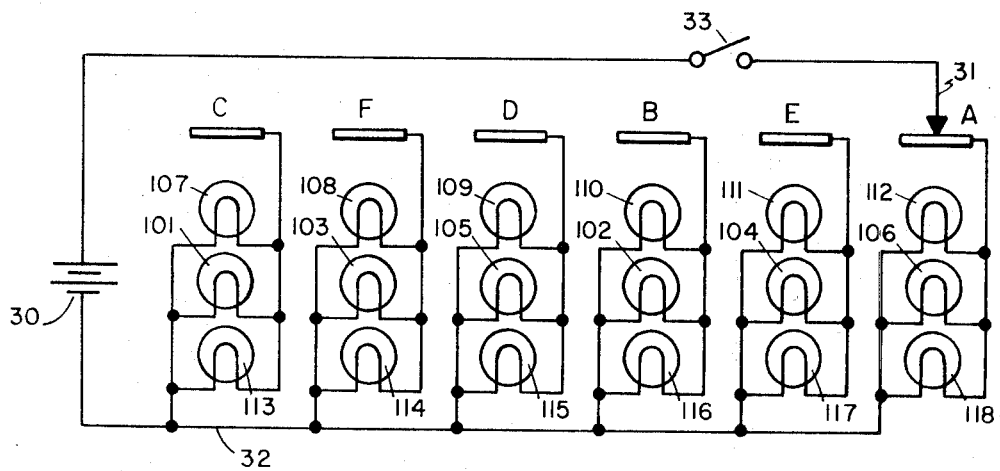
FIG. 3 is a schematic illustration of the electrical circuitry of the device of FIG. 1.

The equivalent circuit of the preferred embodiment is illustrated in FIG. 3. The circuit comprises a voltage source 30 with one lead electrically connected to a moveable contact point 31 through switch 33, and its other lead electrically connected to a common lead 32. Electrically connected to common lead 32 are six identical parallel circuits, each comprising three electrically parallel light sources. Each individual circuit is electrically connected to one of the conductive portions of the surface of the rotating disc, schematically illustrated in FIG. 3 as conductive planes A, B, C, D, E, and F. Thus when moveable contact point 31 contacts any of conductive planes A—F, a circuit is closed incorporating one of the individual three lamp circuits with voltage source 30 and common lead 32 by closing switch 33 causing only the three lamps in that circuit to glow. By appropriate positioning of the lamps of each circuit in the training device, information is visually displayed to the operator.

The circuit shown may either use AC or DC power sources. Alternate circuits may be substituted therefor to accomplish the same results and other components used to provide the desired indications.

In the embodiment shown, contact point 31 is a spring-loaded point mounted on the underside or extending from the underside of the model aircraft 21. Switch 33 may be manually closed by pushing button 34 on the model aircraft 21. Interconnecting leads from the switch and voltage source, which may be a battery conveniently housed in the model aircraft 21, and the light sources in the facsimile meter 40 are connected to appropriate connection points on the disc 12 through a multiconductor cable 35 and plug 20.

For clarity of illustration, the following represents the interconnection scheme of the embodiment shown:

Light Source 118 connected between points 201 and 202
Light Source 117 connected between points 201 and 203
Light Source 116 connected between points 201 and 204
Light Source 113 connected between points 205 and 206
Light Source 114 connected between points 205 and 207
Light Source 115 connected between points 205 and 208 (It will be noted that the above interconnections may be conveniently formed by conductive pins passing vertically through the disc 12 to interconnect the designated light sources below the disc.)
Light Sources 106 and 112 connected between points 210 and 105
Light Sources 110 and 102 connected between points 211 and 205
Light Sources 107 and 101 connected between points 212 and 205
Light Sources 109 and 105 connected between points 213 and 205
Light Sources 111 and 104 connected between points 214 and 205
Light Sources 108 and 103 connected between points 215 and 205 Alternate interconnection schemes which provide the circuit illustrated in FIG. 3 or its equivalent may also be used.

As shown in FIG. 3, a completed circuit is formed between one terminal of voltage source 30, moveable contact point 31, conductive plane A, parallel lamps 112, 106 and 118 and common lead 32 contacting the other terminal of voltage source 30. This condition would result from placing the model aircraft 21 on conductive sector A. The information displayed on the meter 40 would thus be "From" on the To-From indicator and "Fly Right" on the Left-Right indicator. With the OBS set at 360° (360 showing through dial port 13), light source 116 will illuminate window 17 on the 360° radial. If the aircraft is oriented in phase with the OBS setting, that is, 360° magnetic, the craft must fly to its right to intercept the outbound course on the 360° radial. Note that this is the same information which is displayed on the facsimile meter 40. Note also that the model aircraft 21 may be rotated to change its heading, but the information displayed on the facsimile meter 40 will not change.

The aircraft 21 may be moved to the right (as shown in FIG. 1) until contact point 31 makes electrical contact with conductive sector E. Referring to FIG. 3, it will be seen that this will energize light sources 111, 104 and 117. Thus the meter 40 will still indicate "From, " but center rectangle 43 will be illuminated, indicating that the aircraft is on the course set on the OBS. Likewise, if the aircraft is moved to sector B, light sources 102, 110 and 116 will be illuminated, indicating the craft must fly left to intercept the 360° radial.

Note that if the aircraft is positioned in sector C with the OBS setting remaining at 360°, light sources 107, 101 and 113 will be energized. On the meter face, lamp 107 lights the "To" indication and lamp 101 indicates a left pointer position. Lamp 113, positioned in housing 16, illuminates window 17 at the 180° position. Note that as discussed above, the aircraft is South of the station, and, if in phase, must fly left to intercept the 360° inbound course. Note also that although he is in phase, since he is attempting to navigate a course along the 180° radial inbound, he must refer to the 180° radial (not the 360° radial), since the radials are named by their outbound courses.

From the foregoing it will be seen that the information displayed on facsimile meter 40 duplicates the information displayed on the To-From and Left-Right indicators in omni equipment. The real OBS is simulated by dial port 13 and knob 23.

Operation of the training device is substantially identical to operation of real omni equipment. After the pilot has selected the VOR station by which he is to navigate, he adjusts the OBS to the desired course. By turning knob 23 the student obtains the desired OBS setting. The model aircraft is then placed on the surface of disc 12, simulating an aircraft in the radiation field of a VOR station. By pressing button 34 one circuit will be energized. From the indications on the meter 40 the student may determine his position relative to the VOR station and the selected course as explained above.

To further aid the student in the understanding and proper use of omni equipment, a set of instruction cards 52 may be provided. The instruction cards 52 may conveniently be housed in a depression 51 in the surface 11 of the housing 10.

The instruction cards may contain printed or diagrammatic information on one surface thereof posing a problem to be solved by the student. The student may then manipulate the model airplane and the OBS setting on the training device to conform with the set of instructions or duplicate a situation prescribed by the instruction card. The student may then plot a course to intercept the desired radial as instructed. The proper solution to the problem posed may be printed on the back of the card so that the student may immediately check his solution against the correct solution. In such a manner the student may practice at his leisure until he is fully proficient in the understanding and operation of omni equipment.

It will be understood that the printed cards may take the form of instructions, pose navigation problems, or quiz the student on maneuvers, headings, etc. required for any stated situation. Separate sets of cards may be used for novices or beginners, for refresher courses, for VFR and for IFR.

The training device of this invention may be constructed quite inexpensively and, if desired, may be mounted in a suitable carrying case with a handle 53 and a hinged cover (not shown). A suitable depression 50 may be formed in surface 11 to act as a receptacle for the model aircraft 21 when the training device is not in use.

While the invention has been described with particular reference to a battery powered DC circuit, it will be readily understood that other means for suitably providing the informational display may be used. For example, an AC circuit incorporating a suitable step down transformer is satisfactory. Likewise, the informational display meter 40 need not necessarily be mounted on the model airplane, but may be mounted elsewhere on the training device.

It is to be understood that although the invention has been described with particular reference to specific embodiments thereof, the form of the invention as shown and described is to be taken as a preferred embodiment of same, and that various changes and modifications may be resorted to without departing from the spirit and scope of the invention as defined by the appended claims.

I claim:

1. A training device for teaching omnidirectional radio range navigation comprising:
    a. a simulated VOR range comprising a relatively flat surface divided into a plurality of mutually isolated conductive portions extending generally radially from the center of said simulated VOR range,
    b. a facsimile aircraft freely positionable on any portion of said simulated VOR range,
    c. display means simulating a "To-From" indicator and a "Left-Right" course deviation indicator, said display means responsive to the relative position of said simulated aircraft in said simulated VOR range,
    d. means for supplying electrical energy to said conductive portions of said simulated VOR range, and
    e. means for electrically interconnecting said facsimile aircraft and said simulated VOR range whereby the relative position of said facsimile aircraft to the center of said simulated VOR range is indicated on said display means.

2. In combination with the device set forth in claim 1, training instruction means comprising a plurality of cards presenting navigation problems and instructions for solving such problems with said training device.

3. An apparatus comprising:
    a. a housing having a substantially centrally located aperture in the top surface thereof,
    b. a rotatable disc supported within said housing in registry with said centrally located aperture, said rotatable disc having six mutually isolated conductive sectors on the top surface thereof, each of said sectors having boundaries defined by lined extending radially from the center of said rotatable disc,
    c. a series of windows disposed radially and equally spaced about said centrally located aperture, each of said windows being appropriately labeled to indicate its radial position from the first window, said first window being labeled to indicate 0/360°,
    d. indication means mounted on said disc for rotation therewith extending radially from said disc and passing consecutively in registry with each of said windows as said disc is rotated,
    e. a moveable facsimile aircraft freely positionable upon any one of said conductive sectors, said facsimile aircraft supporting electrically operated means for indicating the bearing of said facsimile aircraft to the center of said disc,
    f. means for supplying electrical energy to said conductive sectors, and
    g. means for providing electrical contact between said facsimile aircraft and said conductive sections, thereby completing an electrical circuit through said conductive sectors, said facsimile aircraft and said means for supplying electrical energy to said conductive sectors.

4. The apparatus as set forth in claim 3 and further including:
    a. a dial port in said top surface adjacent said centrally located aperture exposing a portion of the outer surface or disc, and
    b. a plurality of markers substantially equally spaced about the outer portion of said disc, each of said markers individually passing in registry with said dial port as said disc is rotated.

5. The apparatus as set forth in claim 4 wherein said plurality of markers are disposed radially about the 360° circumference of said disc and each respectively indicates its radial position in degrees from a point designated 0/360°.

6. The apparatus set forth in claim 5 wherein said indication means comprises a pair of housings, each located 180° from the other on said disc and each positioned to extend along a radial line passing from the center of said disc through the center of one of said six mutually isolated conductive sections.

7. The apparatus set forth in claim 6 wherein one of said indication means is in registry with the window labeled to indicate 0/360° when the 360° marker positioned in the outer surface of said disc is in registry with said dial port.

8. The apparatus set forth in claim 7 and including at least one light source positioned in each of said housings, and electrically associated with said means for supplying electrical energy to said conductive sectors for illumination of said light source when said facsimile aircraft is positioned on one of the three conductive sectors in nearest proximity thereto.

9. In combination with a device for simulating the relative position of an aircraft in a VOR radiation field comprising a simulated VOR radiation field and a moveable simulated aircraft; electrical means associated with display means, said electrical means comprising:
   a. a voltage source,
   b. a plurality of lamps electrically associated with said voltage service,
   c. a plurality of mutually electrically isolated conductive surfaces positioned on said simulated VOR radiation field, and electrically associated with selected lamps, and
   d. contact means for individually interconnecting said voltage source with each of said conductive surfaces, said display means comprising:
   a. a simulated meter face,
   b. a plurality of translucent areas disposed on the surface of said meter face to simulate the primary positions of a pivotally mounted pointer, and
   c. selected ones of said lamps positioned adjacent each of said translucent areas whereby illumination of said lamps illuminates said primary positions of a pivotally mounted pointer in response to the relative position of said simulated aircraft with respect to the center of said simulated field.

10. In combination with the device set forth in claim 9, training instruction means comprising a plurality of cards, some of which direct the operator to establish specified conditions on the simulated VOR radiation field.

11. A training device for simulating instrument information displayed on omni navigation equipment comprising:
   a. a moveable facsimile aircraft,
   b. display means attached to said moveable aircraft facsimile,
   c. a rotatable disc, the surface of which is divided into six distinct conductive sections which are electrically isolated from each other and electrically associated with an electrical circuit comprising a voltage source and a plurality of electrically energizable light sources, each of said light sources positioned in said display means for indicating relative position of said facsimile aircraft with respect to the center of said rotatable disc, and
   d. means electrically interconnecting said light sources positioned in said display means with one of said six distinct conductive sections and for activating said display means to display different information when said moveable aircraft facsimile is positioned on one of said six distinct sections.